United States Patent
Morton-Finger

(10) Patent No.: US 10,697,091 B2
(45) Date of Patent: Jun. 30, 2020

(54) DEVICE FOR TWISTING A FIBRILLATED STRIP

(71) Applicant: Tarkett Inc., Farnham, Quebec (CA)

(72) Inventor: Jürgen Morton-Finger, Weinheim (DE)

(73) Assignee: TARKETT INC., Farnham, Quebec (CA)

( * ) Notice: Subject to any disclaimer, the term of this patent is extended or adjusted under 35 U.S.C. 154(b) by 346 days.

(21) Appl. No.: 15/598,992

(22) Filed: May 18, 2017

(65) Prior Publication Data
US 2017/0335490 A1 Nov. 23, 2017

(30) Foreign Application Priority Data

May 19, 2016 (EP) .................................... 16170505

(51) Int. Cl.
| | |
|---|---|
| B29C 48/00 | (2019.01) |
| D01D 5/08 | (2006.01) |
| D02G 3/38 | (2006.01) |
| D01H 7/86 | (2006.01) |
| E01C 13/08 | (2006.01) |

(52) U.S. Cl.
CPC ........... D01D 5/08 (2013.01); B29C 48/0019 (2019.02); B29C 48/0022 (2019.02); D01H 7/868 (2013.01); D02G 3/385 (2013.01); E01C 13/08 (2013.01); D10B 2505/202 (2013.01)

(58) Field of Classification Search
CPC ......................... B29C 48/0022; B29C 48/0019
USPC ....................................................... 264/178 F
See application file for complete search history.

(56) References Cited

U.S. PATENT DOCUMENTS

| | | | |
|---|---|---|---|
| 3,899,867 | A | 8/1975 | Northup et al. |
| 6,449,937 | B1 | 9/2002 | Llongueras |
| 8,999,213 | B2 | 4/2015 | Morton-Finger |
| 2011/0309542 | A1 | 12/2011 | Hufschmidt et al. |
| 2014/0048983 | A1 | 2/2014 | Weinhold et al. |

FOREIGN PATENT DOCUMENTS

| | | |
|---|---|---|
| EP | 1126051 A1 | 8/2001 |
| WO | WO2010102921 A2 | 9/2010 |
| WO | WO2012164059 A2 | 12/2012 |

OTHER PUBLICATIONS

Eurpoean Search Report EP16170505.8, dated Jan. 18, 2017.
International Search Report & Written Opinion PCT/CA2017/050600, dated Aug. 25, 2017.

*Primary Examiner* — Christina A Johnson
*Assistant Examiner* — Xue H Liu
(74) *Attorney, Agent, or Firm* — Winston & Strawn LLP

(57) ABSTRACT

A device for twisting a flat, fibrillated strip for producing artificial turf is disclosed. The device includes a hollow shaft having a central axis of rotation, a deflecting element that is mounted on the hollow shaft and that has a swing region, and a limiting element that is disposed on the hollow shaft. The hollow shaft allows the strip to be continuously passed through a hollow space of the hollow shaft. The deflecting element includes a swing pivot that is offset from the central axis. When the hollow shaft is rotated around its central axis, the swing region of the deflecting element is swung outward from the central axis to a swung-out position. As a result, the strip is rested against the swing region. When the deflecting element is in its swung-out position, the strip is rested against the limiting element that limits the outward deflection of the strip.

13 Claims, 3 Drawing Sheets

DEVICE FOR TWISTING A FIBRILLATED STRIP

AREA OF TECHNOLOGY OF THE INVENTION

The invention generally relates to a device for twisting a "fibrillated strip", for producing artificial turf.

BACKGROUND OF THE INVENTION

Known artificial turfs are produced either from monofilaments or from flat, narrow fibrillated strips.

Flat fibrillated strips may be fabricated in the following manner, for example. Typically, a film ca. 2 m wide is produced by extrusion, and is then slit into strips of width ca. 20 mm, using a cutter bar. Then the strips are re-heated and are stretched linearly.

The stretched strips are then cut by means of a "fibrillator". In the "fibrillation" the strip is cut with longitudinal cuts of limited lengths ("sectionwise"), such that a honeycomb pattern is formed in the width of the fibrillated strip, by the individual steps, when the strip is stretched.

Following the "fibrillation", the strip is re-heated and is shrunk by 10-30% ("relaxation" process). A fibrillated strip has width 6-12 mm and thickness 0.1-0.14 mm. It has a flat, rectangular shape if not subjected to tensile force in the lateral direction. At the end of the apparatus the fibrillated strip is wound onto a spool. One fibrillated strip is always wound onto a single spool.

Such a spool is used in the next production step, in which the fibrillated strip is tufted in a tufting process, to produce an expanse of artificial turf (carpet comprised of artificial turf). For this, the fibrillated strips must be guided by the needles of a tufting machine. In this connection, the eye of the tufting needle is employed for guiding, which eye typically has a diameter of 5-6 mm.

Since the flat, fibrillated strips may have a width up 12 mm, they tend to become caught in the eye of the needle.

To avoid this, typically the strips are subjected to twisting. In the twisting process, the strips are twisted in ca. 30 twists per meter, whereby the shape of the flat strip is brought into a round shape which facilitates passing the strip through the eye of the needle.

The twisting imposes additional stress on the strip, to some extent negatively influencing mechanical performance parameters such as strength and elongation.

In addition, the additional production step of twisting entails substantially higher production costs.

Alternatively, it has been proposed to provide a winding (wrap) around the flat, fibrillated strip, with "folding up" of the fibrillated strip. It has been found that the "folding up" is too non-uniform, and that to an appreciable extent the strip still becomes caught in the eye of the needle.

Accordingly, it is an object of the present invention to devise an economical means of more uniformly and more extensively deforming the flat, fibrillated strip wherewith the strip has the desired mechanical performance and in addition can be passed through the eye of a tufting needle without becoming caught there.

SUMMARY OF THE INVENTION

According to an embodiment of the invention, a flat, fibrillated strip for producing artificial turf is comprised of the following:

a hollow shaft having a central axis of rotation in the hollow space of the hollow shaft;
which hollow shaft is designed such that the flat, fibrillated strip can be continuously passed and advanced through the hollow space of the hollow shaft;

a swingably mounted deflecting element which is mounted on the hollow shaft and which has a "swing region";

wherein a swing pivot of the deflecting element is offset from the central axis of rotation of the hollow shaft such that, when the hollow shaft is rotated around its (the shaft's) central axis of rotation, the "swing region" of the deflecting element is swung outward from the central axis of rotation, into a "swung-out position" (deflecting position), by the resulting centrifugal force, whereby the flat, fibrillated strip rests against the "swing region" and is guided from (by) the "swing region" in a concentric path around the central axis of rotation; and a limiting element which is disposed on the hollow shaft such that, when the deflecting element is in its (the deflecting element's) swung-out position, the flat, fibrillated strip also rests against the limiting element, whereby the outward deflection of the flat fibrillated strip is limited;

wherein, in the swung-out position, a passage area is formed between the "swing region" and the limiting element, which passage area is oriented essentially orthogonally to the central axis of rotation and is configured such that the flat, fibrillated strip undergoes deformation when it passes through the passage area.

The fact that the flat, fibrillated strip is continuously guided through the hollow shaft, and is simultaneously guided by the deflecting element in a concentric path around the central axis of rotation, gives rise to a very uniform twisting of the flat, fibrillated strip. In addition, the fibrillated strip is very uniformly deformed by continuously passing it through the passage area; wherewith the combination of the twisting and the deformation converts the previously flat fibrillated strip into a form which can be very successfully passed through the eye of a tufting needle.

According to another embodiment, the device has a flat attaching element for attaching the deflecting element to the hollow shaft; wherein:

the attaching element is mounted on an exit end of the hollow shaft from which end the fibrillated strip which is being advanced emerges from the hollow shaft, and said attaching element is oriented essentially orthogonally to the central axis of rotation;

the swing pivot of the deflecting element is mounted on the attaching element;

the attaching element has an opening intended to accommodate passage of the fibrillated strip; and an area of the opening of the attaching element forms the limiting element.

The attaching element facilitates the mounting of the deflecting element with its swing pivot onto the hollow shaft. In addition it provides an easy means of providing the limiting element.

According to yet another embodiment, the deflecting element has a flat configuration, and has an opening intended to accommodate passage of the fibrillated strip, wherewith a region of the opening in the deflecting element forms the "swing region".

This enables proper guiding of the strip through the deflecting element, the hollow shaft, and the attaching element, at the same time that the "swing region" is formed.

According to still another embodiment:
the opening in the attaching element is disposed around the central axis of rotation of the hollow shaft;
when the deflecting element is in the idle position, with the hollow shaft not rotating, the opening in the deflecting element and the opening of the attaching element are superposed, and together they form the passage area; and
when the deflecting element is in the swung-out position, and the hollow shaft is in rotational movement, the opening in the deflecting element is displaced with respect to the opening in the attaching element, such that the passage area is smaller (is reduced).

Preferably, the passage area is selected such that in the idle position the passage area is large enough that the flat, fibrillated strip at the start of the twisting can be passed through the hollow shaft, the attaching element, and the deflecting element, without becoming caught. E.g. with this embodiment the strip may be rapidly advanced ("shot") with air. The fact that the passage area is then reduced allows the inventive deformation to be carried out without additional elements being provided.

According to another embodiment, the opening in the deflecting element is essentially circular; and the opening in the attaching element is also essentially circular, and has an indentation (notch) which indentation forms the limiting element.

The fact that the openings have an essentially circular shape facilitates the introduction of the strip. The passage area and thereby the desired deformation can be further adjusted by adjusting the shape of the additional indentation (notch).

According to yet another embodiment, the attaching element has at least one stop element for limiting the swinging (e.g. swinging-out) of the deflecting element.

A first stop element can limit the swinging (e.g. the swinging-in) of the deflecting element in the idle position, so that the opening of the deflecting element and the opening of the attaching element are uniformly disposed around the axis of rotation of the hollow shaft. A second stop element can limit the swinging-out of the deflecting element in the swung-out position, so that the passage area and thereby the desired deformation are predetermined.

According to still another embodiment, a system for twisting a flat, fibrillated strip for producing artificial turf is provided, which is comprised of the following:
a flat, fibrillated strip;
a device according to one of the above-described embodiments; and
guide means for continuously guiding the fibrillated strip through the hollow shaft.

This system delivers very uniform twisting and deformation of the flat, fibrillated strip.

According to an embodiment, the system is further comprised of a yarn bobbin with wrapping yarn; wherein:
the hollow shaft is at least partially disposed inside the yarn bobbin; and
the guide means are designed for wrapping the wrapping yarn around the twisted and deformed strip.

Since the yarn bobbin is disposed exteriorly on the hollow shaft, the yarn bobbin can be driven simultaneously with the hollow shaft, whereby the wrapping yarn on the yarn bobbin is then used for "fixing" the twisted and deformed strip. In addition, greater deformation of the strip can be achieved by wrapping the wrapping yarn around the strip.

According to an embodiment, the system is further comprised of a winding device for winding the strip which strip has the wrapping yarn wrapped around it.

The "fixing" of the twisted and deformed strip by means of the wrapping yarn facilitates the winding of the strip, wherewith the strip can be produced and stored in advance. Therefore it is unnecessary to deform the strip immediately prior to the tufting process; this makes the tufting process simpler, easier, and more economical, and allows the tufting process to be carried out with fewer devices.

According to another embodiment, a method of twisting a flat, fibrillated strip for producing artificial turf is provided which is comprised of the following:
preparing a device according to one of the above-described embodiments;
continuously passing the fibrillated strip through the hollow shaft; and
rotating the hollow shaft such that the deflecting element is disposed in the swung-out position, and such that the fibrillated strip is guided, by means of the "swing region", in the circular concentric path around the central axis of rotation, and is deformed.

This method delivers very uniform twisting and deformation of the flat, fibrillated strip.

According to yet another embodiment, the hollow shaft is at least partly disposed inside of a yarn bobbin which bears wrapping yarn, the method further comprising wrapping the twisted and deformed fibrillated strip with the wrapping yarn, after the strip has been guided through the concentric path.

The fact that the yarn bobbin is disposed at least to some extent inside the hollow shaft enables the yarn bobbin to be driven simultaneously with the hollow shaft, whereby the wrapping yarn on the yarn bobbin is then used for "fixing" the twisted and deformed strip. In addition, greater deformation of the strip can be achieved by wrapping the wrapping yarn around the strip.

According to still another embodiment, the method is further comprised of winding the strip which has been wrapped with the wrapping yarn.

The fact that the wrapping yarn "fixes" the twisting and deformation of the strip enables the strip to be wound and thereby to be produced and stored in advance. Therefore it is unnecessary to perform additional deformation on the strip immediately prior to the tufting process; this makes the tufting process simpler, easier, and more economical, and allows the tufting process to be carried out with fewer devices.

According to an embodiment, in a system according to one of the above-described embodiments, the rotational speed with which the wrapping yarn is wrapped around the twisted and deformed fibrillated strip is equal to the rotational speed of the hollow shaft.

This enables the wrapping yarn to be particularly successfully and uniformly wrapped around the twisted and deformed fibrillated strip, enabling the twisted and deformed strip to be advantageously "fixed" in a simple manner.

DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION

Figure 1:
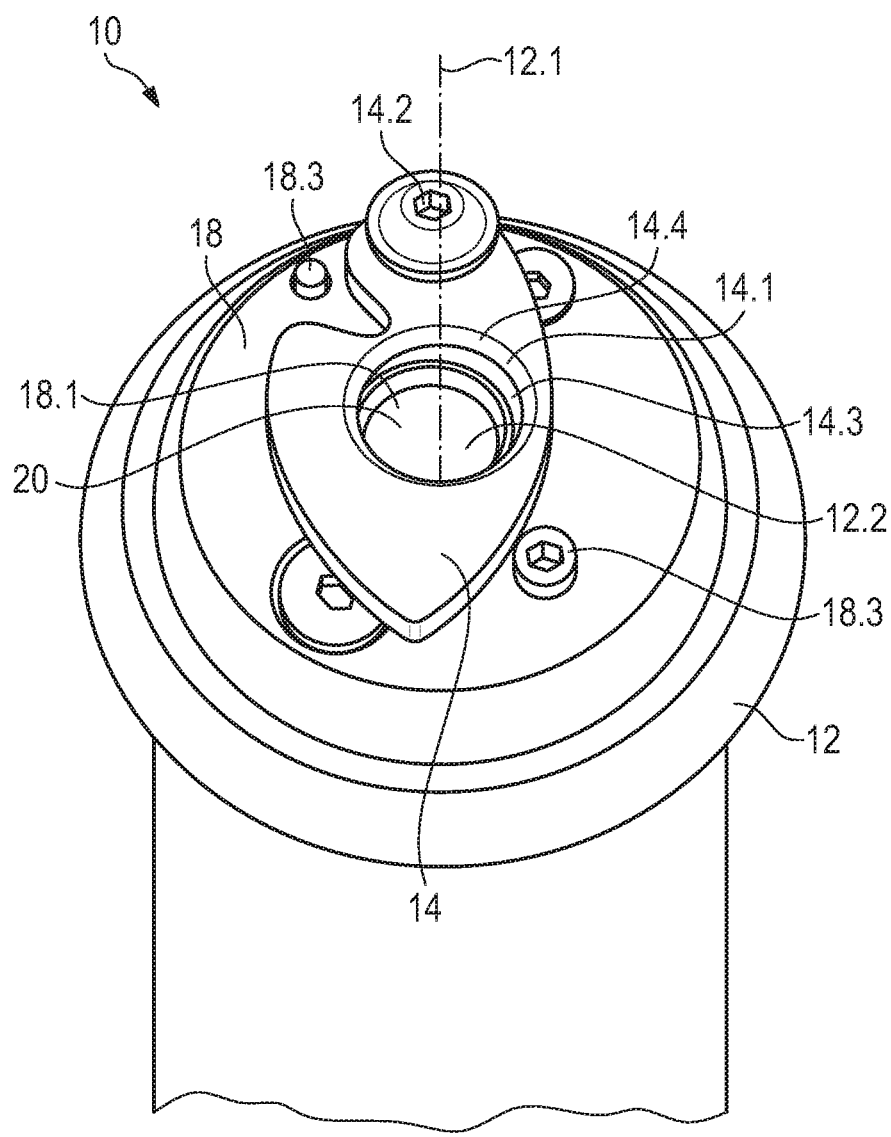
FIG. 1 is a perspective view of an exemplary embodiment of the inventive device.

FIG. 1 illustrates an exemplary embodiment of the inventive device 10 for twisting a flat, fibrillated strip (being a narrow strip) 22 for producing artificial turf, comprised of a hollow shaft 12 with a central axis of rotation 12.1 in its hollow space 12.2, and further comprised of a deflecting element 14 and an attaching element 18.

The attaching element 18 has, e.g., a somewhat flat shape, and is fastened by two screws to an exit end of the hollow shaft 12 from which end the advancing strip 22 emerges from the hollow shaft 12. The attaching element 18 is oriented essentially orthogonally to the central axis of rotation 12.1. The attaching element 18 has an opening 18.1 which can be seen more clearly in FIGS. 3 and 5.

The opening 18.1 may also have a bevel which extends around circularly (not shown) This bevel is present, e.g., on the side facing the hollow shaft 12. In that case, the inner surface of the opening 18.1 is not parallel to the rotational axis 12.1 in the region of the bevel, but is oriented at an angle to the rotational axis 12.1. This facilitates the advancing (and the introduction) of the strip through the opening 18.1.

The deflecting element 14 is connected to the attaching element 18 via a swing pivot 14.2. Further, the deflecting element 14 has an opening 14.3.

Part of the opening 14.3 forms (consists of) a "swing region" 14.1. The strip 22 rests against this swing region 14.1, when the deflecting element 14 is in a swung-out position (as in FIG. 5).

Similarly to the opening 18.1 of the attaching element 18, the opening 14.3 of the deflecting element 14 may have at least one bevel 14.4 which extends around circularly. The bevel 14.4 may be present on the side which faces away from the hollow shaft 12. A second bevel may be present on the side which faces toward the hollow shaft 12 (second bevel not shown). In the "swing region" 14.1, the bevels on one or both sides may be more intense, in order to better guide the strip 22.

In this exemplary embodiment, the attaching element 18 also has two stop elements 18.3, which limit the swinging of the deflecting element 14 in an idle position and in a swung-out position.

Figure 2:
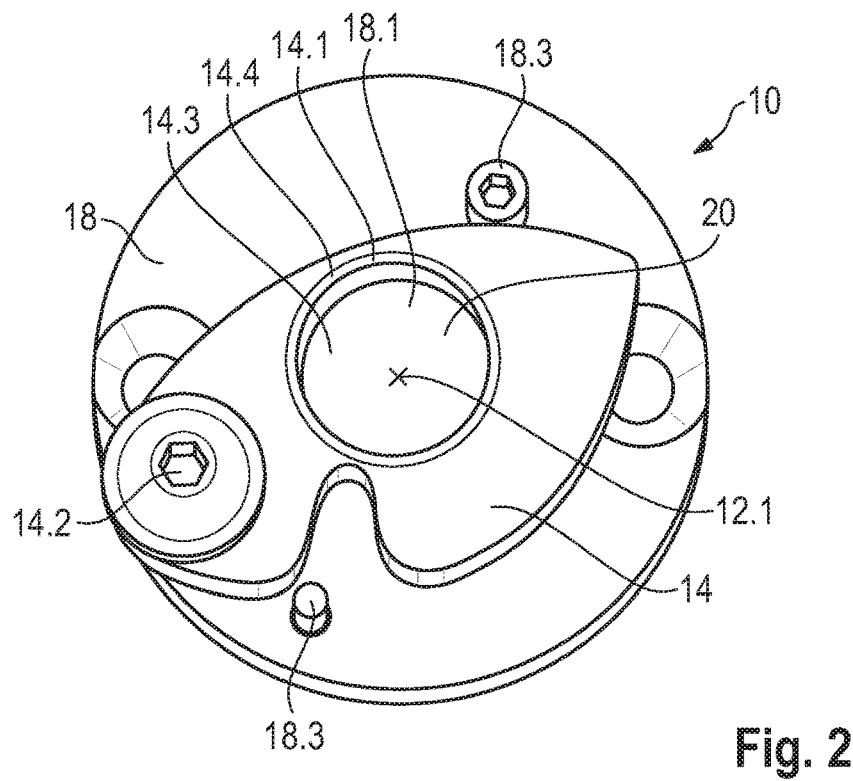
FIG. 2 is a plan view of the inventive device in an idle position in accordance with one or more embodiments of the present invention.
Figure 3:
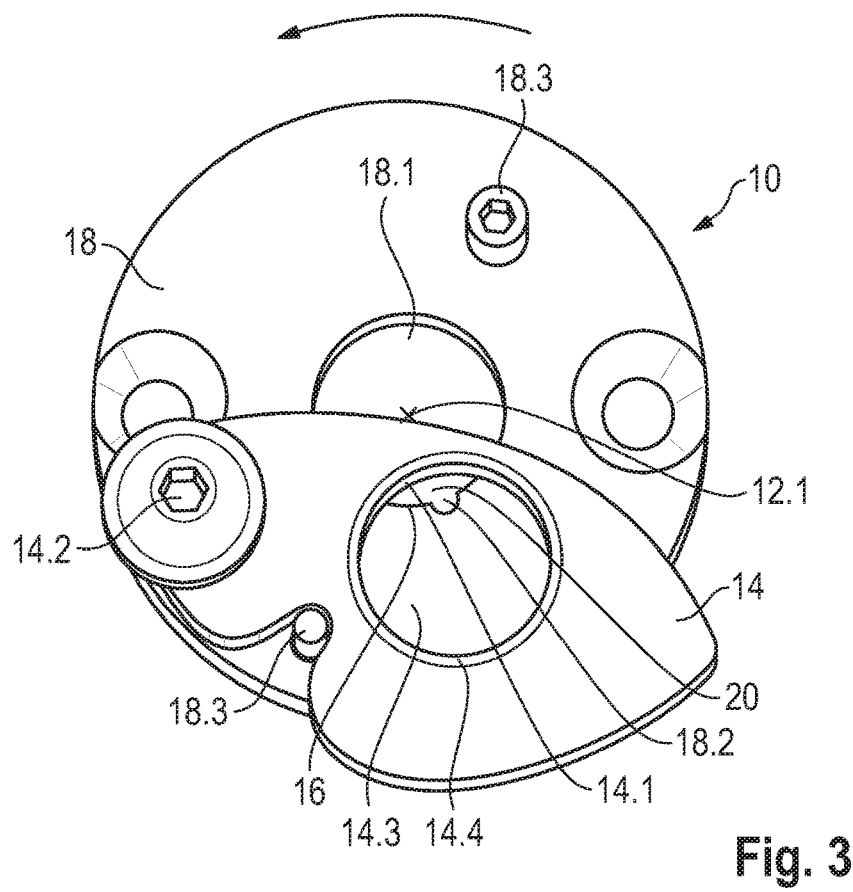
FIG. 3 is a plan view of the inventive device in a swung-out position in accordance with one or more embodiments of the present invention.

The plan views in FIGS. 2 and 3 are simplified, for the purpose of clarity, showing only the attaching element 18 and the deflecting element 14 (in the idle position in FIG. 2 and in the swung-out position in FIG. 3).

In FIG. 2 the hollow shaft 12 is not being rotated around its central axis of rotation 12.1. Accordingly, the deflecting element 14 is in the idle position. In this idle position, preferably the openings 14.3 and 18.1 are disposed concentrically and superposed around the central axis of rotation 12.1. Thereby a large passage area 20 is formed which allows the flat, fibrillated strip 22 to readily pass ("to pass very well"). Preferably, this large passage area 20 is so large that air may be applied for the purpose of rapidly advancing ("shooting") the strip 22 through it. It is particularly advantageous from a production engineering standpoint if the twisting process is started with "shooting" of the strip 22 by means of applied air.

In FIG. 3 the hollow shaft 12 has been rotated around its central axis of rotation 12.1 in the direction of the arrow. By the resulting centrifugal force, the deflecting element 14 is swung into the swung-out position. In FIG. 3 an edge of the opening 18.1 in the attaching element 18 may be seen, which in the present case forms a limiting element 16. In this area, preferably the opening 18.1 in the attaching element 18 has an indentation (notch) 18.2.

When the deflecting element 14 is in the swung-out position, the passage area 20 between the limiting element 16 and the "swing region" 14.1 is reduced compared to the passage area in the idle position. Preferably, the passage area 20 in the swung-out position of the deflecting element 14 is dimensioned such that the flat, fibrillated strip 22 is deformed when it is guided or drawn through the passage area 20.

Figure 4:
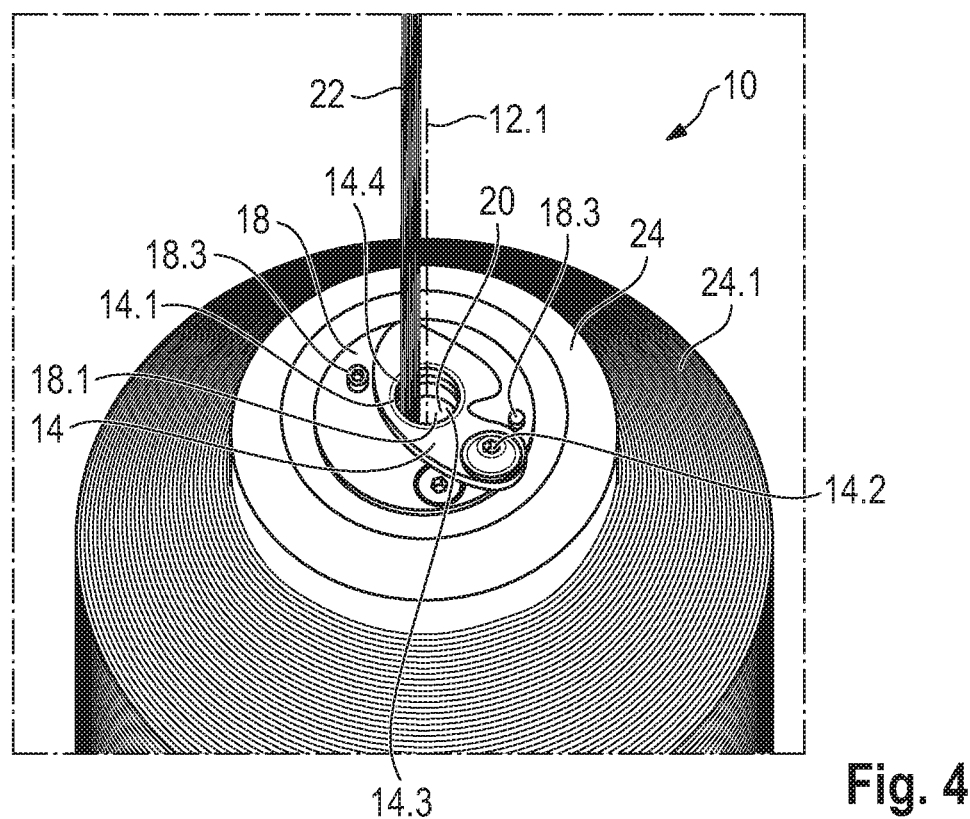
FIG. 4 is a perspective view of an exemplary embodiment of the inventive device, in an idle position.
Figure 5:
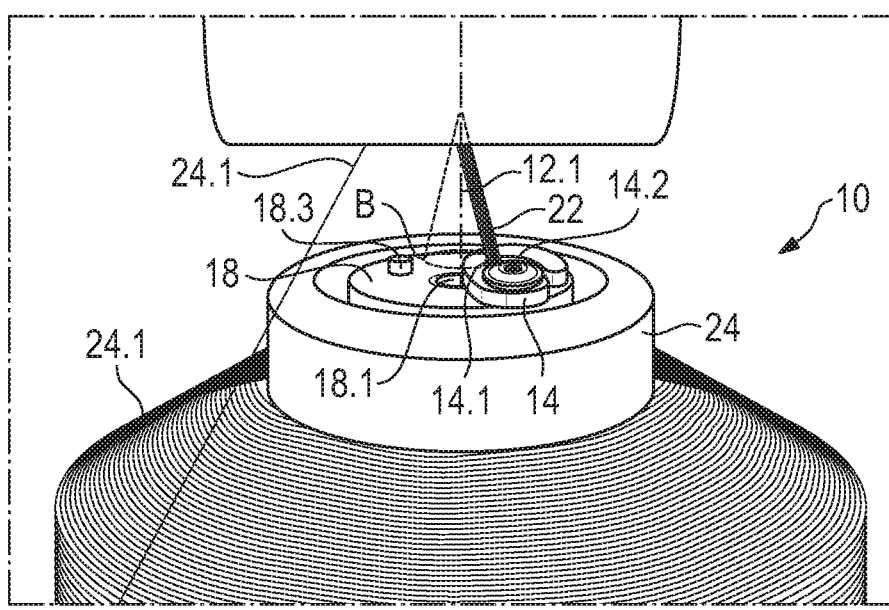
FIG. 5 is a perspective view of an exemplary embodiment of the inventive device, in a swung-out position (deflecting position).

FIGS. 4 and 5 illustrate the inventive device 10 in a system comprised of (in addition) the fibrillated strip 22 and a yarn bobbin 24 which bears the "wrapping yarn" 24.1. In this arrangement, the hollow shaft 12 is at least partially accommodated in the yarn bobbin 24. FIG. 4 illustrates the system in the "idle position", in which the hollow shaft 12 with the yarn bobbin 24 has not been rotated. FIG. 5 shows the system in the swung-out position, in which the hollow shaft 12 with the yarn bobbin 24 has been rotated.

In the swung-out position, the strip 22 rests against the "swing region" 14.1, and as shown in FIG. 5 it is guided by the "swing region" 14.1 against the limiting element 16, until it also rests against the limiting element. The mass of the deflecting element 14 is chosen such that the resulting centrifugal force is sufficient to press outwardly the advancing strip 22 which is being guided.

Since the strip 22 is being continuously guided through the hollow shaft 12 by known guiding means (e.g. rolls, drives, etc., not shown), it undergoes deformation by the reduced passage area 20. Given that the strip 22 rests against the limiting element 16, in this region it is offset from the central axis of rotation 12.1 of the hollow shaft 12. As a result of the rotational movement of the inventive device 10, the strip 22 is thus guided in a circular path B parallel to the swing plane of the deflecting element 14. The guide means guide the strip 22 to a guiding point (not shown) above an exit end of the hollow shaft 12. As a result, the strip 22 is additionally twisted, as a result of the circular movement in the circular path B. Described otherwise, the strip 22 is thus moved in an "essentially conical path" (dotted lines) above the exit end of the hollow shaft 12. In the guiding point, the strip 22 is continuously guided in a "fixing manner" such that there is essentially no reversal of the twisting and deformation.

The rotational movement also causes the wrapping yarn 24.1 to be pulled from the yarn bobbin 24, preferably over the head of the bobbin, and to be wound around the twisted and deformed strip 22, in the region of the "guiding point". This winding of the wrapping yarn 24.1 "fixes" the state of the twisting and deformation of the strip 22.

Then the now "fixed" strip 22 may be wound, preferably onto a bobbin, spool, or the like, and may be sent to the tufting apparatus. Thus, the strip 22 can be prepared for tufting at a location different from that of the tufting apparatus, and at a time different from the tufting process, which offers logistic and cost advantages.

It is particularly advantageous if the rotational speed at which the wrapping yarn 24.1 is wound around the twisted and distorted strip 22 is equal to the rotational speed of the hollow shaft 12.

In general, it is possible for the deflecting element 14 to be disposed in the hollow space 12.2 of the hollow shaft 12 (this is not shown). According to another embodiment (not shown), it is also possible for the deflecting element 14 to be mounted directly on the hollow shaft 12, wherewith the limiting element 16 is formed by an inner region of the hollow shall 12 itself. This simplified embodiment does not require the means of attaching (being namely the attaching element) 18, nor does it require the indentation 18.2. This embodiment of the invention may be employed under circumstances which depend on the type of strip 22 and the rotational speed.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

LIST OF REFERENCES NUMERALS

10 Device.
12 Hollow shaft.
12.1 Axis of rotation.
12.2 Hollow space.
14 Deflecting element.
14.1 "Swing region".
14.2 Swing pivot.
14.3 Opening.
14.4 Bevel.
16 Limiting element.
18 Attaching element.
18.1 Opening.
18.2 Indentation (notch).
18.3 Stop element.
20 Passage area.
22 (Narrow) fibrillated strip.
24 Yarn bobbin.
24.1 Wrapping yarn.
B Path.

The invention claimed is:

1. A device for twisting a flat, fibrillated strip for producing artificial turf; comprising the following:
a hollow shaft having a central axis of rotation in the hollow space of the hollow shaft;
which hollow shaft is designed such that the flat, fibrillated strip can be continuously passed and advanced through the hollow space of the hollow shaft;
a swingably mounted deflecting element which is mounted on the hollow shaft and which has a swing region;
wherein a swing pivot of the deflecting element is offset from the central axis of rotation of the hollow shaft such that, when the hollow shaft is rotated around the shaft's central axis of rotation, the swing region of the deflecting element is swung outward from the central axis of rotation, into a swung-out position, by the resulting centrifugal force, whereby the flat, fibrillated strip rests against the swing region and is guided from the swing region in a concentric path around the central axis of rotation; and
an indentation which is disposed on the hollow shaft such that, when the deflecting element is in the deflecting element's swung-out position, the flat, fibrillated strip also rests against the indentation, whereby the outward deflection of the flat fibrillated strip is limited;
wherein, in the swung-out position, a passage area is formed between the swing region and the indentation, which passage area is oriented essentially orthogonally to the central axis of rotation and is configured such that the flat, fibrillated strip undergoes deformation when it passes through the passage area.

2. The device according to claim 1; further comprising a flat attaching element for attaching the deflecting element to the hollow shaft; wherein:
the attaching element is mounted on an exit end of the hollow shaft from which end the fibrillated strip which is being advanced emerges from the hollow shaft, and said attaching element is oriented essentially orthogonally to the central axis of rotation; wherein the swing pivot of the deflecting element is mounted on the attaching element;
the attaching element has an opening intended to accommodate passage of the fibrillated strip; and
an area of the opening of the attaching element forms the indentation.

3. The device according to claim 2; wherein the deflecting element has a flat configuration, and has an opening to accommodate passage of the fibrillated strip, wherein a region of the opening forms the swing region.

4. The device according to claim 3; wherein:
the opening in the attaching element is disposed around the central axis of rotation of the hollow shaft;
when the deflecting element is in the idle position, with the hollow shaft not rotating, the opening in the deflecting element and the opening of the attaching element are superposed, and together they form the passage area; and
when the deflecting element is in the swung-out position, and the hollow shaft is in rotational movement, the opening in the deflecting element is displaced with respect to the opening in the attaching element, such that the passage area is reduced.

5. The device according to claim 4; wherein:
the opening in the deflecting element is essentially circular; and
the opening in the attaching element is essentially circular, and includes the indentation.

6. The device according to claim 2; wherein the attaching element has at least one stop element for limiting the swinging of the deflecting element.

7. A system for twisting a flat, fibrillated strip for producing artificial turf; comprising the following:
a flat, fibrillated strip;
a device according to claim 1; and
a guide continuously guiding the fibrillated strip through the hollow shaft.

8. The system according to claim 7; further comprised of:
a yarn bobbin with wrapping yarn; wherein:
the hollow shaft is at least partially disposed inside the yarn bobbin; and
the guide wraps the wrapping yarn around the twisted and deformed strip.

9. The system according to claim 8; further comprised of a winding device that wraps the strip that has been wrapped with the wrapping yarn.

10. A method of twisting a flat, fibrillated strip for producing artificial turf; comprising:
   preparing a device according to claim 1;
   continuously passing the fibrillated strip through the hollow shaft; and
   rotating the hollow shaft such that the deflecting element is disposed in the swung-out position, and such that the fibrillated strip is guided, by the swing region, in the circular concentric path around the central axis of rotation, and is deformed.

11. The method according to claim 10; wherein the hollow shaft is at least partly disposed inside of a yarn bobbin which bears wrapping yarn, the method further comprising wrapping the twisted and deformed fibrillated strip with the wrapping yarn.

12. The method according to claim 11; further comprising winding the fibrillated strip which has been wrapped with the wrapping yarn.

13. The method according to claim 11; wherein a rotational speed with which the wrapping yarn is wrapped around the twisted and deformed fibrillated strip is equal to a rotational speed of the hollow shaft.

\* \* \* \* \*